May 5, 1970 J. A. BURGMAN ET AL 3,510,393
HOLLOW GLASS ARTICLE
Original Filed Oct. 1, 1962
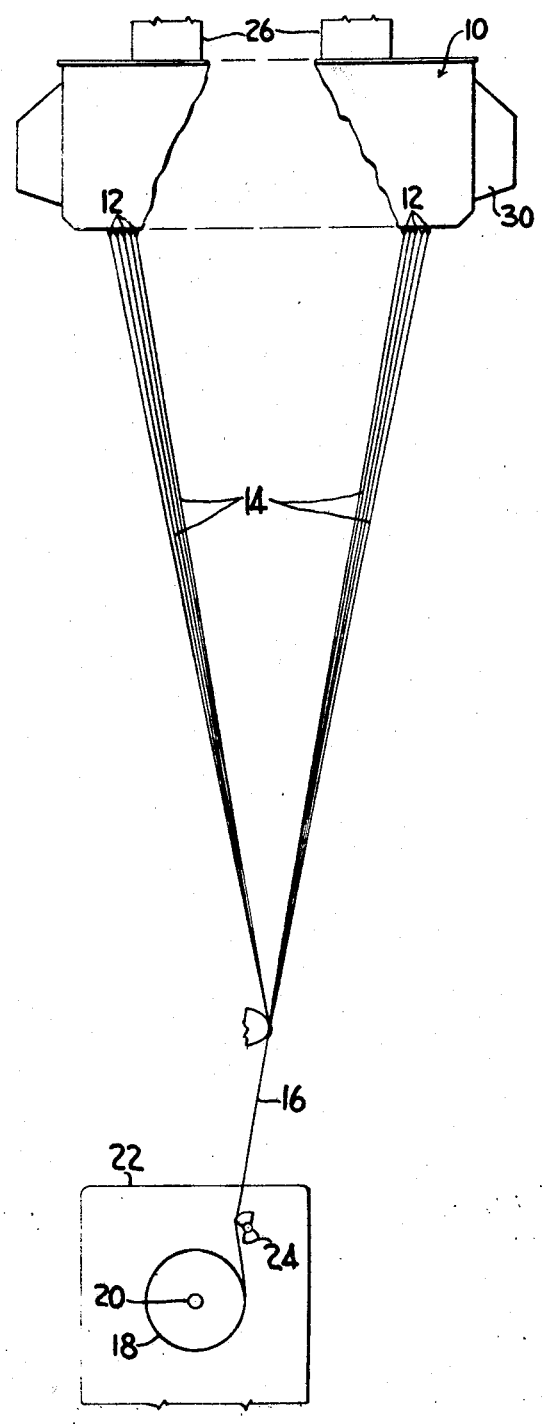
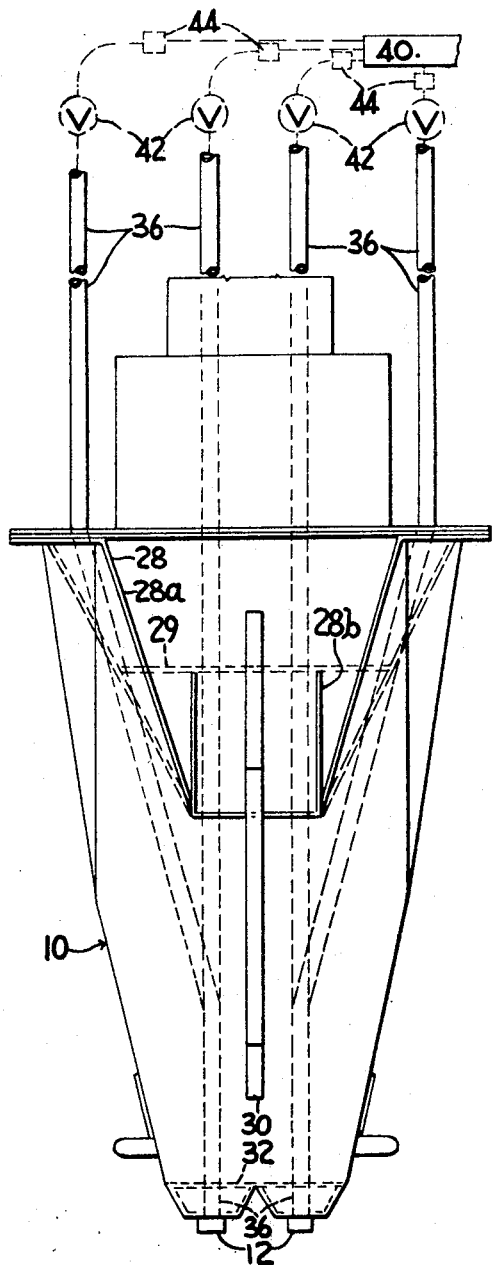
INVENTORS
JEROME A. BURGMAN &
LESTER L. MARGASON
BY Chisholm and Spencer
ATTORNEYS

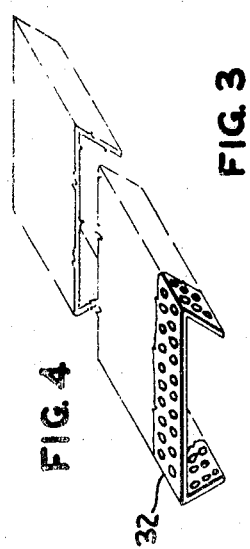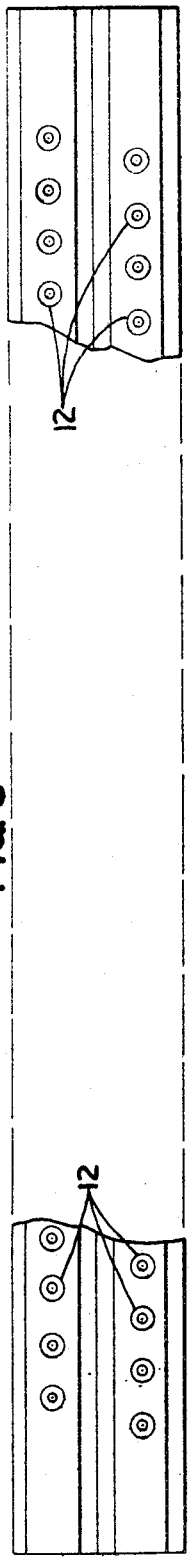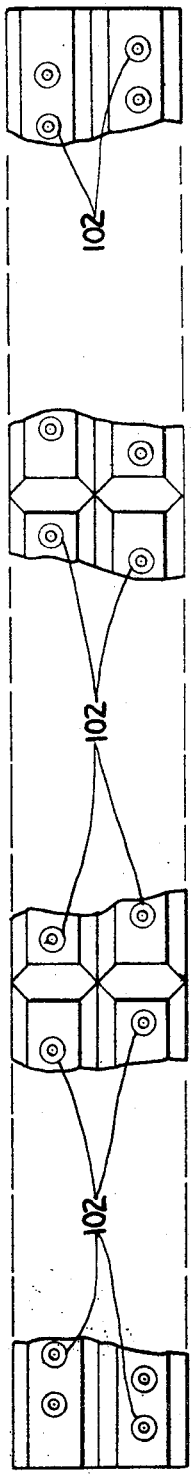

United States Patent Office 3,510,393
Patented May 5, 1970

3,510,393
HOLLOW GLASS ARTICLE
Jerome A. Burgman, Pittsburgh, and Lester L. Margason, Cheswick, Pa., assignors to PPG Industries, Inc., a corporation of Pennsylvania
Continuation of application Ser. No. 462,706, June 9, 1965, which is a division of application Ser. No. 227,420, Oct. 1, 1962. This application Feb. 27, 1967, Ser. No. 618,594
Int. Cl. D02g 3/18
U.S. Cl. 161—178   1 Claim

ABSTRACT OF THE DISCLOSURE

A strand of hollow glass fibers produced from a molten bath of glass and grouped together during their manufacture.

CROSS-REFERENCES TO RELATED APPLICATIONS

This application is a continuation of our copending application Ser. No. 462,706, filed June 9, 1965, now abandoned, which latter application is a division of application Ser. No. 227,420, filed Oct. 1, 1962, now abandoned.

DISCLOSURE

This application relates to the production of glass fibers and more specifically to the production of hollow glass fibers.

The usual glass fiber is solid in section and is drawn from a source of molten glass through an orifice in the bushing plate known as a tip. In the modern process, as many as 800 fibers are drawn at the same time from closely spaced tips of a bushing. These fibers are generally gathered into a strand and collected onto a forming tube. A binder is usually applied to the group of fibers to retain them in the strand configuration.

It is to be remembered that each fiber in a strand will be substantially uniform in diameter and that fibers for strand forming are drawn which vary from 0.00003 inch to .00080 inch in diameter. Primary fibers for blown products, i.e., where the primary fiber is subjected to a hot gaseous blast and collected as a mat, are generally of larger diameters.

Much consideration has been given to the concept of retaining the strength of the cross-sectional area of the fibers while reducing the weight of the composite in which the fiber is used. Hollow fibers meet this requirement. In filament wound applications, where a continuous filament is wrapped or wound about a mandrel, a high glass to resin ratio is obtainable and desirable. Filament wound composites insure high strength in a relatively lightweight object. Filament wound applications include the manfacture of rocket motor cases, hydro-space vehicle bodies, large storage tanks, radar domes, and other housings of similar size and nature. Substantially the same. rigidity can be obtained with reduction in weight by substituting hollow fibers for solid fibers in such applications. Where electrical properties are considered, hollow fiber strands are advantageous because of the reduction in the dielectric constant as compared to that of solid fibers.

Known processes for producing hollow fibers are limited in that one—a single—fiber is produced. Generally, to applicants' best knowledge, single fibers are produced by flame drawing a preformed glass tube into a fiber size, as illustrated in the U.S. Letters Pat. No. 2,269,459 to Kleist, issued Jan. 13, 1942. This limitation of number and the process of production has seriously affected the cost of such fibers and has materially retarded their use to date.

The production of a plurality of hollow fibers each of substantial uniformity has been successfully accomplished by using the apparatus to be herein described. In the apparatus, a bushing is provided with a plurality of tips through which glass flows as streams to be attenuated by winding means which applies a tractive force to the streams, so as to attenuate the streams into filaments. A tube having a tapered terminal end and being connected to a source of pressurized gas is concentrically located within each tip. Simultaneously with the passage of glass through each tip and around the concentric tube, pressurized gas is continuously discharged through each tube into the interior of the glass stream at a predetermined distance from the terminal end of the tip, so as to produce a hollow stream of glass which is attenuated into a filament of hollow configuration. The hollow filaments are grouped into a strand and the strand is collected onto a forming tube in a conventional manner. Each filament so produced has substantially the same diameter and the wall thickness of each fiber is substantially uniform.

To further understand the inventive features, attention is directed to the accompanying drawings, in which:

FIG. 1 is a side view of an apparatus for drawing a plurality of hollow fibers and particularly illustrating a bushing made in accordance with this invention;

FIG. 2 is an enlarged end view of the bushing shown in FIG. 1;

FIG. 3 is a bottom view of the bushing shown in FIG. 1 and particularly illustrating the multiple tips;

FIG. 4 is a perspective view of a perforated sheet used in the bushing of FIG. 1;

FIG. 6 is a bottom view similar to FIG. 3 showing a modification in the bushing and tip arrangements.

Figure 5:
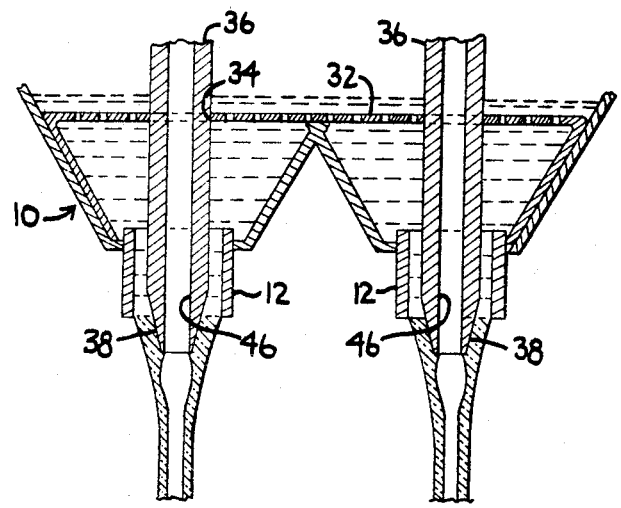
FIG. 5 is an enlarged sectional view of adjacent tips of the bushing of FIG. 1.

Referring now to the drawings, especially FIG. 1, there is illustrated an arrangement for simultaneously drawing a plurality of hollow fibers, which arrangement includes a marble-melt bushing 10 having a plurality of tips 12 at its bottom through which streams of glass issue to be attenuated into fibers 14. The tips 12 are tubular members welded to openings in the bottom of the bushing so as to extend downwardly from the bushing. The fibers 14 are grouped into a strand 16 which is wound on a forming tube 18 received on a rotating mandrel 20 of a winding apparatus 22. The tractive force to attenuate the streams of glass into the fibers 14 is supplied by the winding apparatus 22. To distribute the strand 16 over the length of the forming tube 18, a traverse 24 is employed. This traverse 24 may be similar to that described and claimed in the United States Letters Patent to Beach, No. 2,391,- 870, issued Jan. 1, 1946. The traverse 24 may also be moved relative to and laterally of the mandrel 20 or the mandrel 20 may be moved relative to and laterally of the traverse 24 in order to use relatively long forming tubes 18 and collect a substantial quantity of strand.

The bushing 10 has a pair of upstanding feed tubes 26 through which marbles of glass of the desired composition are fed. Automatic mechanism for feeding the marbles in predetermined time sequence or in response to glass level may be employed if found necessary or desirable. Because such feed mechanisms are well known in the art and form no part of this invntion, a description of their details is not considered necessary.

A heater basket 28 is located within the bushing and is constructed of perforated sheet material 28a, such as a sheet having 100 holes per square inch, each of 0.070 inch in diameter, heater strips 28b and heater strip support wires 29 welded to the sides of the basket. The basket 28 is welded to the ends of the bushing. Lugs 30, 30 are welded to the ends of the bushing and extend therefrom. These lugs 30, 30 are connected by conventional means to a source of electrical power (not shown) which furnishes the power to energize the basket and supply heat to the bushing to melt the marbles fed to the bushing. The basket effectively divides the bushing into a melting zone and a refining zone and, because of its perforated construction permits passage of glass from one zone to another without the passage of large, connected pieces of marbles.

Below the heater basket 28 is a perforated plate 32 having openings 34 aligned with the tips 12 (see also FIGS. 4 and 5). The plate 32 has depending sides which abut the sides of the bushing closely adjacent the tips.

A tube 36 having a conical end 38 is received in each plate opening 34 with a portion within and concentric to a tip 12. The plate 32 serves to maintain the tubes properly aligned with their respective tips. The other terminal end of each tube 36 extends to a location above the surface of the glass in the bushing and is connected to a supply of gas, under a pressure above atmospheric, indicated at 40. A valve 42, as well as a pressure regulating means 44, is in the connecting line to control the gas supply to each tube 36.

The molten glass flows through the annulus defined by the tips 12 and the tube 36 as a stream. A constant supply of gas delivered at uniform pressure is supplied through the bore 46 of the tube 36 and insures a hollow configuration fiber being produced from the glass stream. The concentricity of the tube 36 and the tip 12 coupled with controlled pressure gas, and uniform attenuating force assures the production of uniform diameter fibers having substantially constant thickness walls.

As will be noted and illustrated in FIG. 3, the tips 12 of the bushing above described are arranged in two rows, slightly separated from one another with the tips of one row offset longitudinally with respect to those in the other row, so as to insure fiber separation and thus cooling until the fibers are grouped as a strand.

Attention is now directed to FIG. 6 showing a modified bushing form. The bushing 100 is a marble-melt bushing used in the same fiber drawing arrangement illustrated in FIG. 1. The bushing 100 has a plurality of tubular tips 102 at its bottom through which streams of glass issue to be attenuated into fibers which fibers are grouped as a strand and wound on a forming tube of a winding apparatus.

The bushing 100 is constructed in the same manner as the bushing 10 with the exception of tip arrangement and thus requires little further description except for that of tip arrangement.

The tips 102 of the bushing 100 are arranged in a slightly different manner than the tips 12 previously described. In this embodiment there are three longitudinal sections of two rows with the tips again offset in each row from those in the other row. This arrangement is well shown in FIG. 6 which also indicates constructional details of the bushing 100 in that there are portions which appear to be notched, but are in reality zones where various sub-assemblies are joined together to form the whole. More rigidity is given to the assembly by this procedure which further insures alignment of the hollow tubes concentrically within the tips 102.

The relative position of the tubes 36 with respect to the terminal end of the tips 12 has been found to be important in the production of continuously hollow fibers. If the tube extends too far from the terminal end of the tip or if the tube does not extend a sufficient distance from the terminal end of the tip, continuously hollow fibers will not be produced. When the tube 36 extends too far from the terminal end of the tip, the glass necks down rapidly to produce a fiber with very thin unstable walls. When the tube 36 does not extend a sufficient distance, an intermittently hollow, heavy walled, fiber is produced.

By varying the rate of attenuation, air pressure and the size of the orifice tip uniform diameter fibers of 0.00030 inch to 0.0003 inch outside diameter (O.D.) can be produced having 10 percent to 65 percent of their volume hollow. Fibers with more than 65 percent of their volume hollow are unstable because of thin walls while those less than 10 percent are approaching a solid cross section.

As a specific example hollow fibers having an outside diameter of 0.00050 inch and an inside diameter of 0.00032 inch (walls of 0.00009 inch thickness) have been successfully produced using a bushing as illustrated in FIGS. 1–5. This bushing produced 50 filaments which were gathered into a strand by conventional winding apparatus, as illustrated. A silane size as disclosed in copending U.S. application Ser. No. 79,031, filed Dec. 28, 1960, now Pat. 3,168,389, was applied to the filaments prior to being grouped into the strand. Each tip 12 of the bushing 10 had a length of 0.1875 inch and an inner diameter of 0.130 inch. The tube 36 was concentrically located with the tip and was constructed with an outer diameter of 0.062 inch and an inner diameter of 0.020 inch. The end 38 of each tube was provided with a 12 degree taper extended 0.060 inch below the terminal end of the tip 12, optimum fibers were produced. It was also found that usable hollow fibers were produced when the tube extended an additional distance of 10 percent from the terminal end of the tip and when the nose extended only about 50 percent of the disclosed distance. Using the same tip configuration and varying dimensions of the tip diameter (both inner and outer) it has been found that the tube position was preferably the same. The tube 36 thus preferably extends 0.060 inch below the terminal end of the tip 12, but satisfactory hollow fibers can be produced when the tube 36 is 0.030 inch to 0.066 inch below the terminal end of the tip 12. Usable hollow fibers were not produced at positions of the tube 36 outside this range with respect to tips 12.

The pressure of the gas introduced through the tubes 36 was constant during fiber production. A pressure differential up to 15 inches of water can exist between the atmosphere within the tube 36 and thus the hollow fibers being produced and the surrounding atmosphere.

We claim:
1. A flexible strand of glass fibers comprising a plurality of continuous glass fibers of hollow configuration produced simultaneously from a molten bath of glass and grouped together during their manufacture, each said fiber having a thin wall contiguous to the walls of adjacent hollow fibers, said fibers being connected with a flexible binder and each fiber having an outside diameter of 0.0003 inch to 0.003 inch and 10 percent to 65 percent of its volume hollow.

References Cited

UNITED STATES PATENTS

| | | | |
|---|---|---|---|
| 2,313,296 | 3/1943 | Lamesch | 161—178 |
| 2,484,003 | 10/1949 | Simison | 161—178 |
| 2,915,806 | 12/1959 | Grant | 65—1 X |
| 2,965,925 | 12/1960 | Dietzsch | 18—8 |
| 3,066,365 | 12/1962 | Moore | 161—176 X |
| 3,121,254 | 2/1964 | Heynen et al. | 65—86 |
| 3,177,058 | 4/1965 | Slayter et al. | 65—15 |
| 3,257,183 | 6/1966 | Slayter et al. | 65—6 |
| 3,282,667 | 11/1966 | Stalego | 65—8 |

OTHER REFERENCES

"Inorganic Fibers," National Trade Press, 1058, pp. 8, 13, 16, and 39.

ROBERT F. BURNETT, Primary Examiner

J. D. FOSTER, Assistant Examiner

U.S. Cl. X.R.

65—3, 4